US007004063B1

(12) United States Patent  
Li

(10) Patent No.: US 7,004,063 B1
(45) Date of Patent: Feb. 28, 2006

(54) BARBEQUE GRILL ASSEMBLY WITH A FOLDABLE SIDE RACK

(75) Inventor: Chung-Shuan Li, Yung-Kang (TW)

(73) Assignee: Tsann Kuen Enterprise Co., Ltd., Taipei (TW)

(*) Notice: Subject to any disclaimer, the term of this patent is extended or adjusted under 35 U.S.C. 154(b) by 0 days.

(21) Appl. No.: 11/047,325

(22) Filed: Jan. 31, 2005

(51) Int. Cl.
*A23L 1/00* (2006.01)
*A47J 37/00* (2006.01)
*A47J 37/07* (2006.01)
*F24C 3/00* (2006.01)
*F24C 3/08* (2006.01)

(52) U.S. Cl. ............................. 99/339; 99/340; 99/385; 99/450; 99/481; 99/482; 126/9 R; 126/25 R; 126/41 R

(58) Field of Classification Search .................. 99/339, 99/340, 385, 389, 444–450, 481, 482; 126/25 R, 126/9 R, 41 R, 30, 40, 50, 304 R, 305; 248/129, 248/156, 146, 150; 211/187, 201; 108/101, 108/99, 152, 192
See application file for complete search history.

(56) References Cited

U.S. PATENT DOCUMENTS

| | | | | | |
|---|---|---|---|---|---|
| 2,787,995 | A | * | 4/1957 | Alter | 99/339 |
| 5,104,080 | A | * | 4/1992 | Berger | 248/250 |
| 5,163,358 | A | * | 11/1992 | Hanagan et al. | 99/339 |
| 5,163,359 | A | * | 11/1992 | McLane, Sr. | 99/447 |
| 5,165,385 | A | * | 11/1992 | Doolittle et al. | 99/339 |
| 5,471,916 | A | * | 12/1995 | Bird et al. | 99/446 |
| 5,666,941 | A | * | 9/1997 | Teufel et al. | 99/339 |
| 5,934,183 | A | * | 8/1999 | Schlosser et al. | 99/385 |
| 6,000,389 | A | * | 12/1999 | Alpert | 126/25 R |
| 6,308,616 | B1 | * | 10/2001 | Johnson | 99/339 |
| 6,546,925 | B1 | * | 4/2003 | Wu | 126/41 R |
| 6,591,830 | B1 | * | 7/2003 | Wu | 126/25 R |
| 6,595,198 | B1 | * | 7/2003 | Mosher et al. | 126/38 |

* cited by examiner

Primary Examiner—Timothy F. Simone
(74) Attorney, Agent, or Firm—Ladas & Parry LLP

(57) ABSTRACT

A barbeque grill assembly includes a grill housing, a support frame, and a side rack. The grill housing includes a lower housing part that has an upright lower lateral wall. The support frame is mounted movably on the lower lateral wall, has an inner end that extends into the lower housing part and an outer end that is disposed outwardly of the lower housing part, and is movable horizontally between extended and retracted positions relative to the lower lateral wall. The side rack is coupled pivotally to the outer end of the support frame, and is pivotable to a horizontal unfolded position, in which the side rack is disposed on top of the support frame, when the support frame is at the extended position. The side rack is further pivotable from the unfolded position to a vertical folded position to permit retraction of the support frame.

13 Claims, 6 Drawing Sheets

BARBEQUE GRILL ASSEMBLY WITH A FOLDABLE SIDE RACK

BACKGROUND OF THE INVENTION

1. Field of the Invention

The invention relates to a barbeque grill assembly, more particularly to a barbeque grill assembly with a foldable side rack.

2. Description of the Related Art

A conventional barbeque grill assembly generally includes a grill housing, a heating unit mounted in the grill housing, a stand for supporting the grill housing, and a pair of side racks mounted to opposite lateral sides of the grill housing for placing dishes, foodstuffs, etc. The side racks are usually designed to be foldable so as to facilitate transport and storage of the barbeque grill assembly.

SUMMARY OF THE INVENTION

The object of the present invention is to provide a barbeque grill assembly with a side rack that can be folded and unfolded in a simple yet stable manner.

Accordingly, the barbeque grill assembly of the present invention comprises a grill housing, a support frame, and a side rack. The grill housing includes a lower housing part that has an upright lower lateral wall. The support frame is mounted movably on the lower lateral wall, has an inner end that extends into the lower housing part and an outer end that is disposed outwardly of the lower housing part, and is movable horizontally between extended and retracted positions relative to the lower lateral wall. The side rack is coupled pivotally to the outer end of the support frame, and is pivotable to a horizontal unfolded position, in which the side rack is disposed on top of the support frame, when the support frame is at the extended position. The side rack is further pivotable from the unfolded position to a vertical folded position to permit movement of the support frame from the extended position to the retracted position so as to bring the side rack close to the lower lateral wall.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
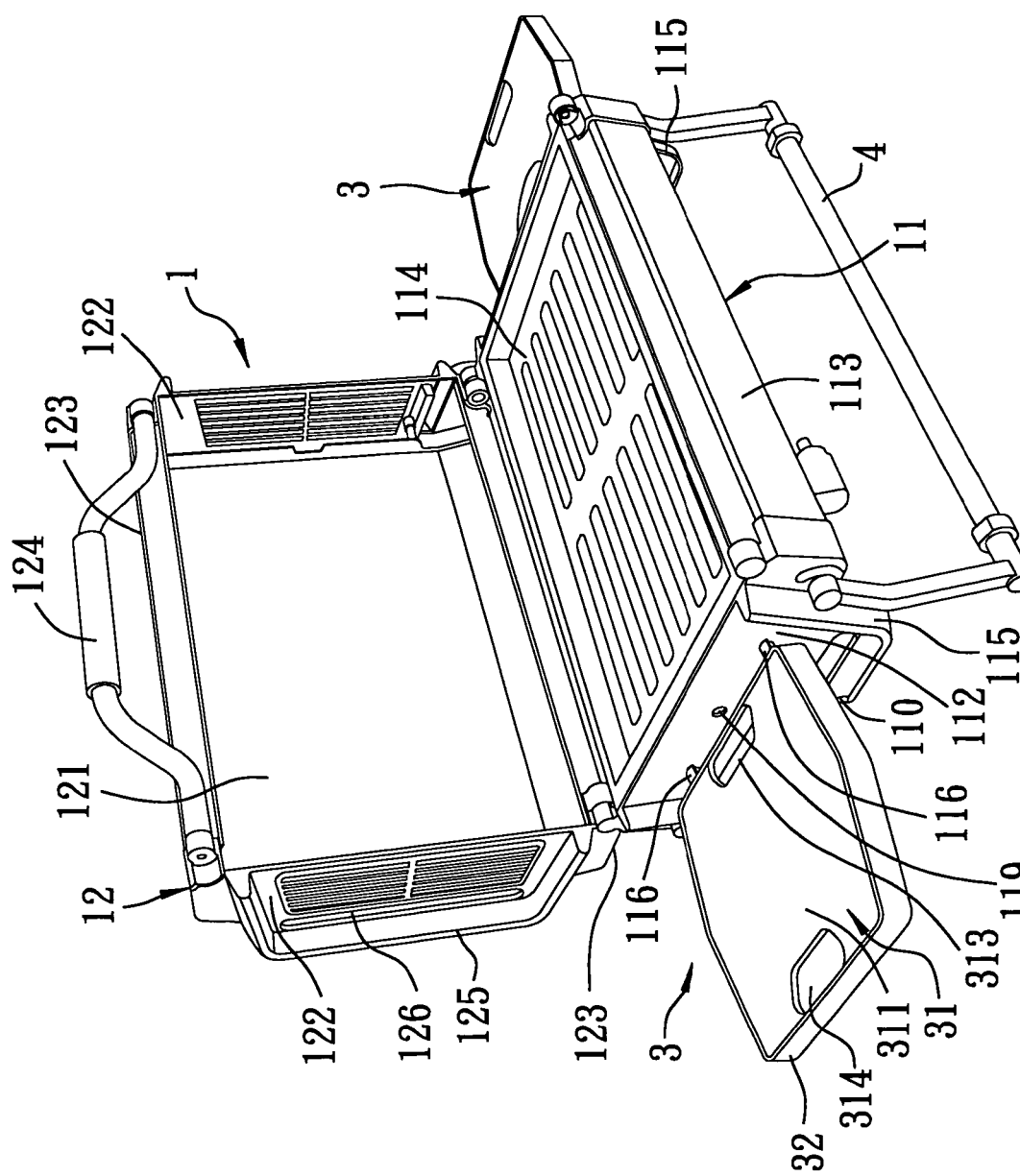
FIG. 1 is an assembled perspective view of the preferred embodiment of a barbeque grill assembly according to the present invention.
Figure 2:
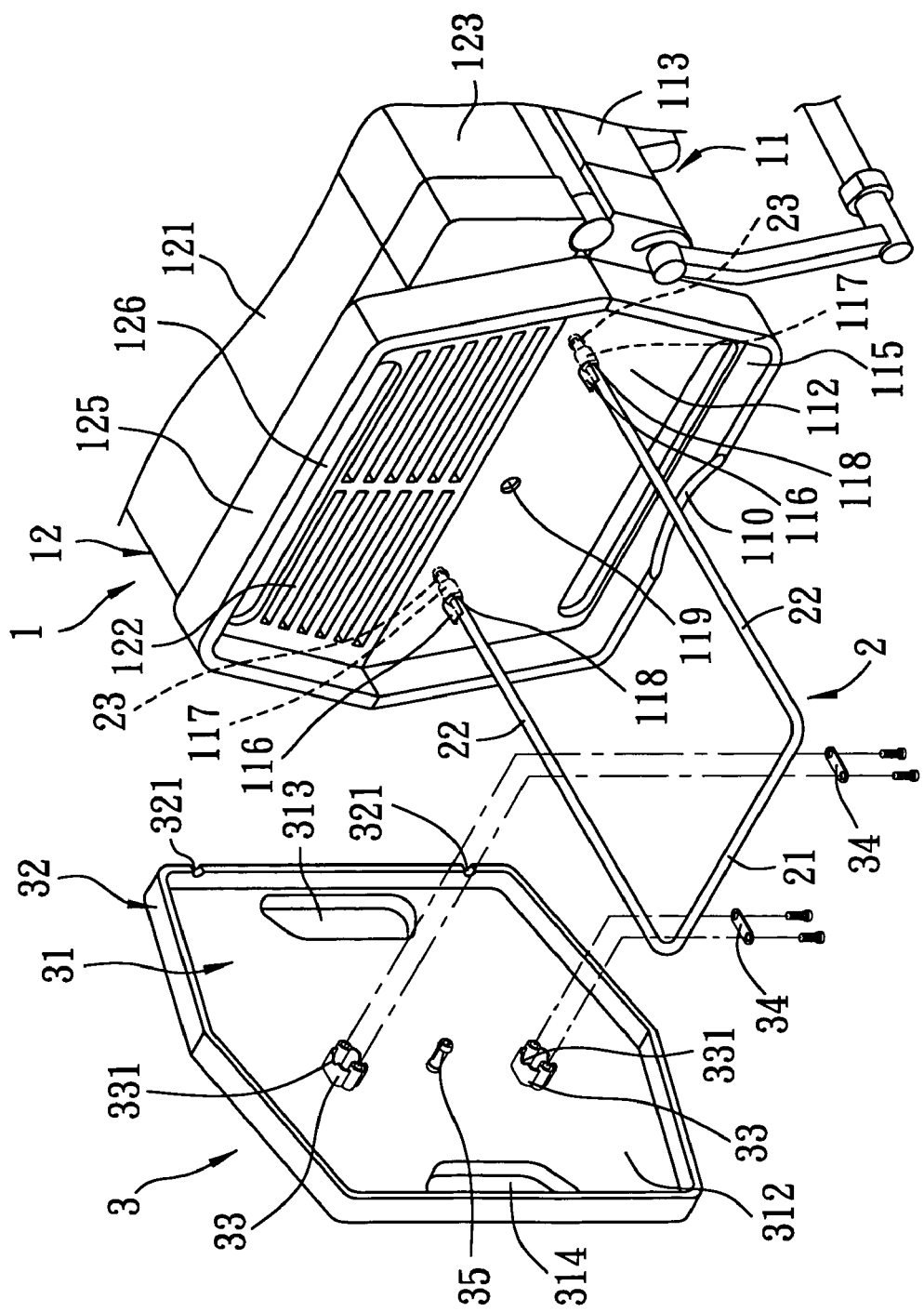
FIG. 2 is a partly exploded, fragmentary perspective view of the preferred embodiment.
Figure 3:
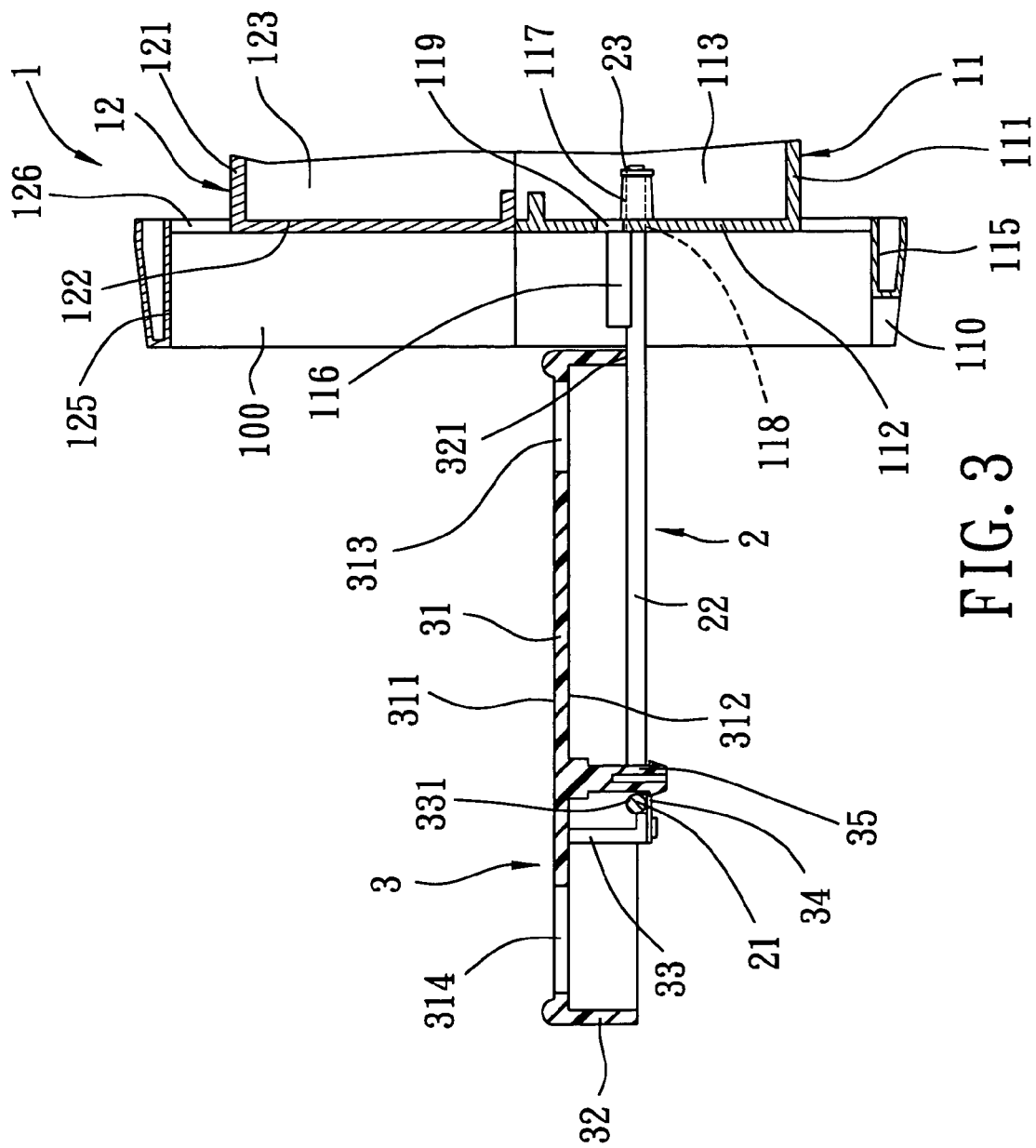
FIG. 3 is a fragmentary schematic sectional view of the preferred embodiment, illustrating a support frame in an extended position and a side rack in an unfolded position.

As shown in FIGS. 1, 2 and 3, the preferred embodiment of a barbeque grill assembly according to the present invention includes a grill housing 1, a pair of support frames 2, a pair of side racks 3, and a stand 4. The barbeque grill assembly further includes a known heating unit (not shown) mounted in the grill housing 1 to serve as a heat source for barbeque. Since the heating unit is not pertinent to the claimed invention, a description of the same is omitted herein for the sake of brevity.

The grill housing 1 includes a lower housing part 11 and an upper housing part 12.

The lower housing part 11 includes a bottom wall 111, two upright lower lateral walls 112 that extend respectively and upwardly from opposite lateral edges of the bottom wall 111, upright lower front and rear walls 113 that extend respectively and upwardly from opposite front and rear edges of the bottom wall 111 and that are connected to the lower lateral walls 112, a grill plate 114 that is supported removably on upper edges of the lower lateral, front and rear walls 112, 113, a pair of lower peripheral U-shaped flanges 115 each extending transversely and outwardly from a periphery of a respective one of the lower lateral walls 112, two pairs of stop blocks 116, and two pairs of tubular guide posts 117. Each of the lower lateral walls 112 is formed with a pair of mounting holes 118. The grill plate 114 is adapted for placing foodstuffs, such as fish, meat, vegetable, etc. thereon, and the heating unit (not shown) is disposed under the grill plate 114. Each of the lower peripheral flanges 115 has a lower edge that is formed with a handling groove 110 for extension of fingers therein. Each of the stop blocks 116 is disposed on an outer side of one of the lower lateral walls 112 above a respective mounting hole 118. Each of the guide posts 117 is disposed on an inner side of one of the lower lateral walls 112 at a periphery of a respective mounting hole 118.

The upper housing part 12 has a bottom rear edge that is connected pivotally to an upper rear edge of the lower housing part 11. The upper housing part 12 includes a top wall 121, two upright upper lateral walls 122 that extend respectively and downwardly from opposite lateral edges of the top wall 121, upright upper front and rear walls 123 that extend respectively and downwardly from opposite front and rear edges of the top wall 121 and that are connected to the upper lateral walls 122, a handle 124 mounted on the upper front wall 123, and a pair of inverted U-shaped upper peripheral flanges 125 each extending transversely and outwardly from a periphery of a respective one of the upper lateral walls 122. The handle 124 facilitates pivoting of the upper housing part 12 for covering and uncovering the lower housing part 11. Each of the upper lateral walls 122 is formed with a finger hole 126 adjacent to an upper edge thereof. The finger hole 126 provides convenience when moving the barbeque grill assembly. When the upper housing part 12 covers the lower housing part 11, the upper lateral walls 122 and the upper peripheral flanges 125 cooperate with the lower lateral walls 112 and the lower peripheral flanges 115 to form a pair of rack receiving spaces 100.

Each of the support frames 2 is mounted movably on a respective one of the lower lateral walls 112, has an inner end that extends into the lower housing part 11 and an outer end that is disposed outwardly of the lower housing part 11, and is movable horizontally between extended and retracted positions relative to the respective lower lateral wall 112. In this embodiment, each of the support frames 2 is U-shaped, and includes a rack mounting section 21 at the outer end thereof, a pair of parallel extension sections 22 that extend from the rack mounting section 21 and into the lower housing part 11 through the mounting holes 118 and the posts 117 on the respective lower lateral wall 112, and a pair of C-shaped rings 23 mounted respectively on distal ends of the extension sections 22 that are distal from the rack mounting section 21 to limit further movement of the support frame 2 from the retracted position to the extended position.

Figure 4:
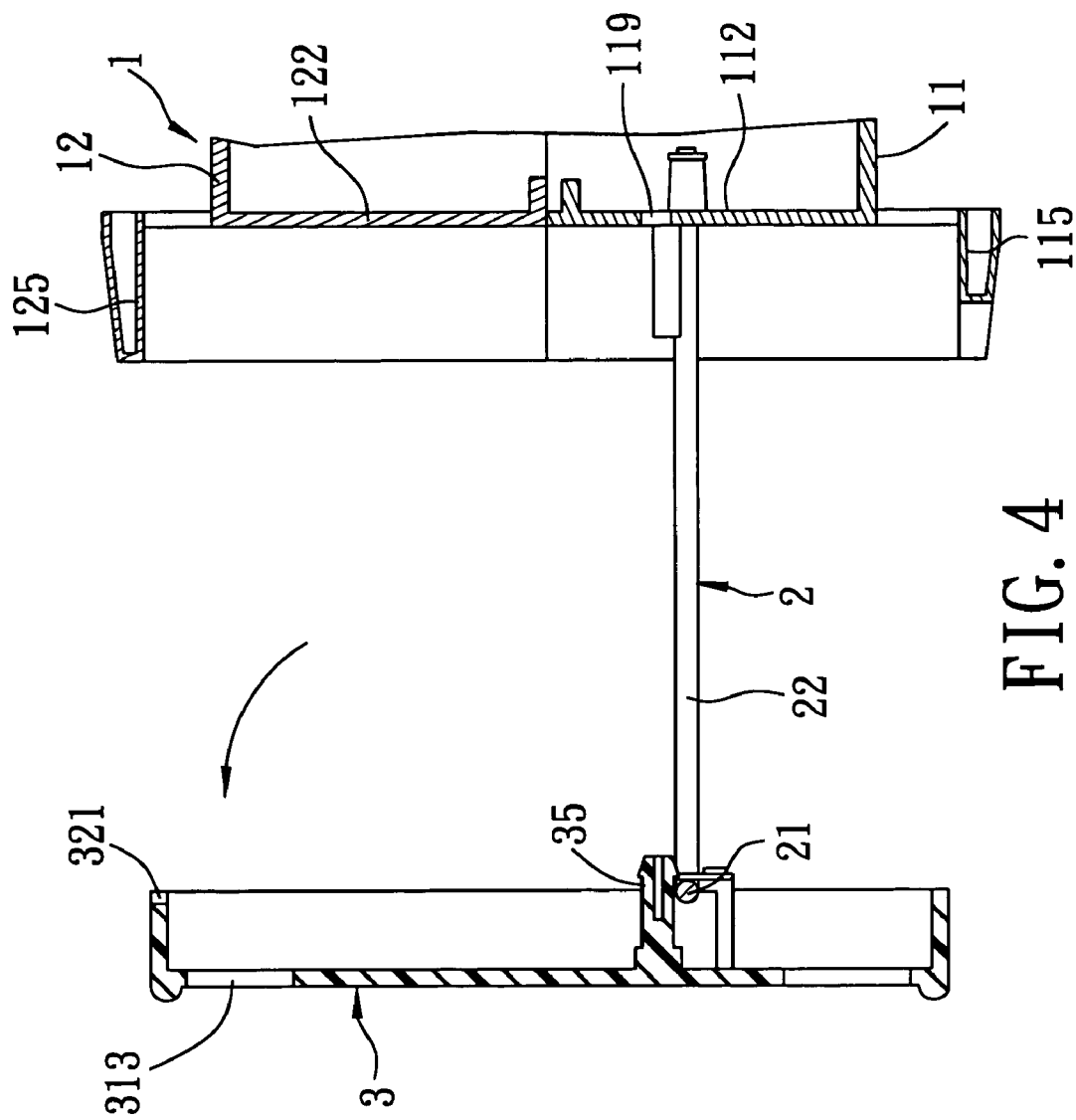
FIG. 4 is a view similar to FIG. 3, but illustrating the support frame in the extended position and the side rack in a folded position.
Figure 5:
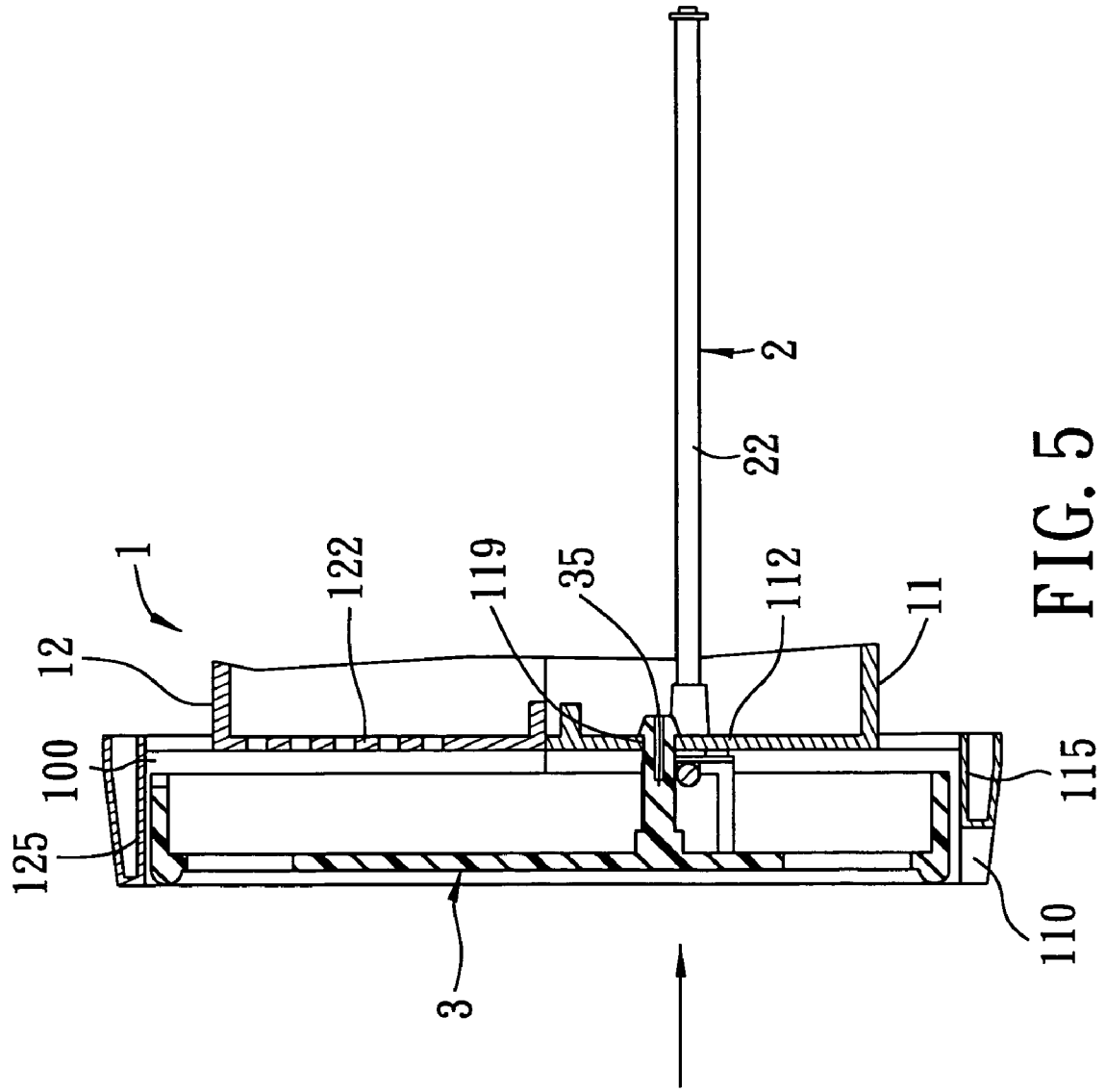
FIG. 5 is another view similar to FIG. 3, but illustrating the support frame in a retracted position and the side rack in the folded position.
Figure 6:
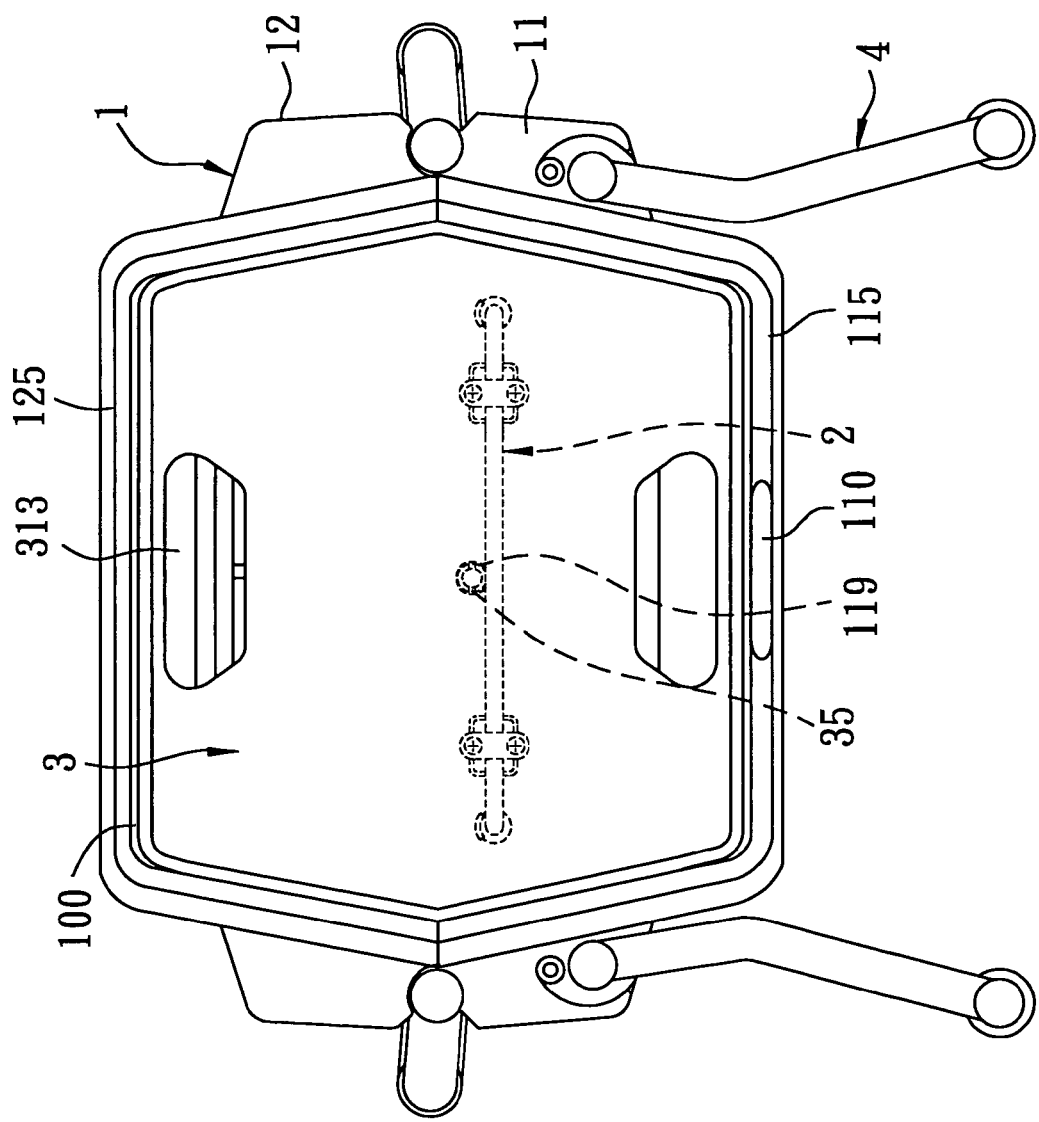
FIG. 6 is a schematic side view of the preferred embodiment.

Each side rack 3 is made of plastic in this embodiment, and is coupled pivotally to the rack mounting section 21 of a respective one of the support frames 2. Each side rack 3 is pivotable to a horizontal unfolded position, in which the side rack 3 is disposed on top of the respective support frame 2, when the respective support frame 2 is at the extended position, as best shown in FIG. 3. Each side rack 3 is further pivotable from the unfolded position to a vertical folded position to permit movement of the respective support frame 2 from the extended position to the retracted position so as to bring the side rack 3 close to an adjacent lower lateral wall 112 of the grill housing 1, as best shown in FIGS. 4 and 5. The side racks 3 have dimensions sufficient to enable the same to fit into a respective one of the rack receiving spaces 100 (see FIG. 6). Each of the side racks 3 includes a rack body 31, a peripheral wall 32, a pair of foot projections 33, and a pair of retainer plates 34. The rack body 31 has a first side 311 adapted for placing dishes, foodstuffs, etc. thereon, a second side 312 opposite to the first side 311, and a pair of finger holes 313, 314 that are formed through the first and second sides 311, 312. The peripheral wall 32 extends transversely from a periphery of the rack body 31, and is formed with a pair of notches 321, each of which permits extension of a respective one of the extension sections 22 therethrough when the side rack 3 is at the unfolded position and the respective support frame 2 is at the extended position, as best shown in FIG. 3. Each of the foot projections 33 extends from the second side 312 of the rack body 31, and is formed with a notch 331 so as to enable the foot projection 33 to straddle rotatably the rack mounting section 21 of the respective support frame 2. Each of the retainer plates 34 is secured to a respective one of the foot projections 33, and retains rotatably the rack mounting section 21 of the respective support frame 2 between the respective foot projection 33 and the retainer plate 34.

The barbeque grill assembly further includes a pair of anchoring units, each of which anchors a respective one of the side racks 3 to the corresponding one of the lower lateral walls 112 of the lower housing part 11 when the respective side rack 3 is at the folded position and the corresponding support frame 2 is at the retracted position. In this embodiment, each anchoring unit includes an anchor hole 119 formed in one of the lower lateral walls 112 between the mounting holes 118, and an anchor plug 35 formed on the second side 312 of the rack body 31 between the foot projections 33 to engage removably the anchor hole 119 when the respective side rack 3 is at the folded position and the corresponding support frame 2 is at the retracted position, as best shown in FIG. 5.

The stand 4 serves to support the grill housing 1 on a surface. Since the structure of the stand 4 is irrelevant to the claimed invention, a description of the same is omitted herein for the sake of brevity.

FIG. 3 illustrates a state where one of the side racks 3 is at the unfolded position and the corresponding support frame 2 is at the extended position. The side rack 3 is disposed on top of the corresponding support frame 2, and is supported by the extension sections 22 of the latter. The extension sections 22 extend through the notches 321 in the peripheral wall 32 of the side rack 32. The C-shaped rings 23 abut against the guide posts 117 to arrest further outward movement of the support frame 2. Moreover, the stop blocks 116 cooperate with the side rack 3 to prevent undesired inward movement of the support frame 2. As such, the side rack 3 is positioned stably on top of the support frame 2, and can be used to place objects, such as dishes and foodstuff, thereon.

When it is desired to store the barbeque grill assembly, by extending one hand of the user through the finger hole 313 in the side rack 3, the side rack 3 can be pivoted upwardly from the unfolded position of FIG. 3 to the folded position of FIG. 4. Then, as shown in FIG. 5, the side rack 3 is pushed toward the grill housing 1 until the anchor plug 35 engages the anchor hole 119 so as to dispose the corresponding support frame 2 at the retracted position. At this time, with reference to FIG. 6, the side rack 3 is received in the respective rack receiving space 100, in which upper and lower portions of the side rack 3 are surrounded by the upper and lower peripheral flanges 125, 115 of the upper and lower housing parts 12, 11, respectively.

In other embodiments, a larger number of anchoring units may be employed. Moreover, it is also possible that there is only one side rack 3. In that case, only one support frame 2 is needed.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A barbeque grill assembly comprising:
 a grill housing including a lower housing part that has an upright lower lateral wall;
 a support frame mounted movably on said lower lateral wall, having an inner end that extends into said lower housing part and an outer end that is disposed outwardly of said lower housing part, and movable horizontally between extended and retracted positions relative to said lower lateral wall; and
 a side rack coupled pivotally to said outer end of said support frame,
 said side rack being pivotable to a horizontal unfolded position, in which said side rack is disposed on top of said support frame, when said support frame is at the extended position,
 said side rack being further pivotable from the unfolded position to a vertical folded position to permit movement of said support frame from the extended position to the retracted position so as to bring said side rack close to said lower lateral wall.

2. The barbeque grill assembly as claimed in claim 1, wherein said lower housing part further has a U-shaped lower peripheral flange that extends transversely and outwardly from a periphery of said lower lateral wall, and that surrounds a lower portion of said side rack when said side rack is at the folded position and said support frame is at the retracted position.

3. The barbeque grill assembly as claimed in claim 2, wherein said grill housing further includes an upper housing part that is connected pivotally to said lower housing part and that has an upright upper lateral wall and an inverted U-shaped upper peripheral flange extending transversely and outwardly from a periphery of said upper lateral wall and surrounding an upper portion of said side rack when said upper housing part covers said lower housing part, said side rack is at the folded position, and said support frame is at the retracted position.

4. The barbeque grill assembly as claimed in claim 3, wherein said upper lateral wall is formed with a finger hole adjacent to an upper edge thereof.

5. The barbeque grill assembly as claimed in claim 1, wherein said support frame includes a rack mounting section at said outer end thereof, and a pair of parallel extension sections that extend from said rack mounting section and into said lower housing part through said lower lateral wall, said side rack being connected pivotally to said rack mounting section, said extension sections supporting said side rack thereon when said side rack is at the unfolded position and said support frame is at the extended position.

6. The barbeque grill assembly as claimed in claim 5, wherein said support frame further includes a pair of C-shaped rings mounted respectively on distal ends of said extension sections that are distal from said rack mounting section to limit further movement of said support frame from the retracted position to the extended position.

7. The barbeque grill assembly as claimed in claim 1, further comprising an anchoring unit for anchoring said side rack to said lower lateral wall when said side rack is at the folded position and said support frame is at the retracted position.

8. The barbeque grill assembly as claimed in claim 7, wherein said anchoring unit includes:
   an anchor hole formed in said lower lateral wall; and
   an anchor plug formed on said side rack to engage removably said anchor hole when said side rack is at the folded position and said support frame is at the retracted position.

9. The barbeque grill assembly as claimed in claim 1, wherein said support frame includes a rack mounting section at said outer end thereof, and a pair of parallel extension sections that extend from said rack mounting section and into said lower housing part through said lower lateral wall, said side rack including a rack body, a foot projection that extends from said rack body and that straddles rotatably said rack mounting section, and a retainer plate secured to said foot projection for retaining rotatably said rack mounting section between said foot projection and said retainer plate.

10. The barbeque grill assembly as claimed in claim 9, wherein said foot projection is notched to permit straddling of said foot projection on said rack mounting section.

11. The barbeque grill assembly as claimed in claim 5, wherein said side rack has a peripheral wall formed with a pair of notches, each of which permits extension of a respective one of said extension sections therethrough when said side rack is at the unfolded position and said support frame is at the extended position.

12. The barbeque grill assembly as claimed in claim 8, wherein said side rack is further formed with a finger hole therethrough.

13. The barbeque grill assembly as claimed in claim 2, wherein said lower peripheral flange has a lower edge formed with a handling groove.

* * * * *